United States Patent
Lam

(10) Patent No.: US 7,460,656 B2
(45) Date of Patent: Dec. 2, 2008

(54) DISTRIBUTED PROCESSING IN CONFERENCE CALL SYSTEMS

(75) Inventor: Siu H. Lam, Woodcliff Lake, NJ (US)

(73) Assignee: Intel Corporation, Santa Clara, CA (US)

( * ) Notice: Subject to any disclaimer, the term of this patent is extended or adjusted under 35 U.S.C. 154(b) by 1118 days.

(21) Appl. No.: 10/742,560

(22) Filed: Dec. 18, 2003

(65) Prior Publication Data

US 2005/0135280 A1    Jun. 23, 2005

(51) Int. Cl.
*H04M 3/42* (2006.01)
(52) U.S. Cl. .............................. 379/202.01; 348/14.07; 370/267; 379/88.16; 381/98
(58) Field of Classification Search .............. 379/88.16, 379/202.01; 381/98; 704/200; 370/260, 370/267; 348/14.07
See application file for complete search history.

(56) References Cited

U.S. PATENT DOCUMENTS

| | | | |
|---|---|---|---|
| 5,280,561 A * | 1/1994 | Satoh et al. | 704/200 |
| 6,956,828 B2 * | 10/2005 | Simard et al. | 370/260 |
| 7,242,783 B1 * | 7/2007 | Weeks et al. | 381/98 |

* cited by examiner

*Primary Examiner*—Gerald Gauthier
(74) *Attorney, Agent, or Firm*—Christopher K. Gagne

(57) ABSTRACT

Conference calls are handled using distributed processing. In one embodiment, the invention includes receiving sets of telephone audio signals from conference subnodes, the telephone audio signals corresponding to subscribers of the conference call, selecting an output set of telephone audio signals from all of the received telephone audio signals, and transmitting the output set to the conference subnodes. In another embodiment, the invention includes receiving a set of telephone audio signals, each signal being received from a subscriber node of a single conference call, selecting a subset of the set of signals, transmitting the selected subset of signals to a conference node, receiving a second set of telephone audio signals from the conference node, and transmitting the second set to the subscriber nodes.

28 Claims, 3 Drawing Sheets

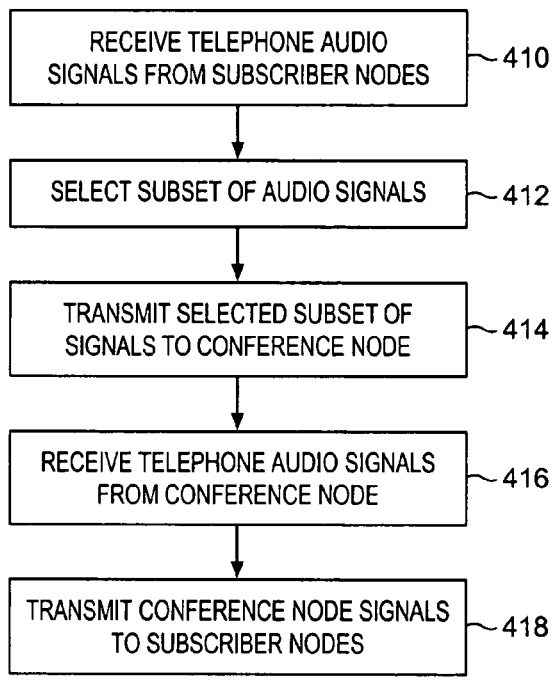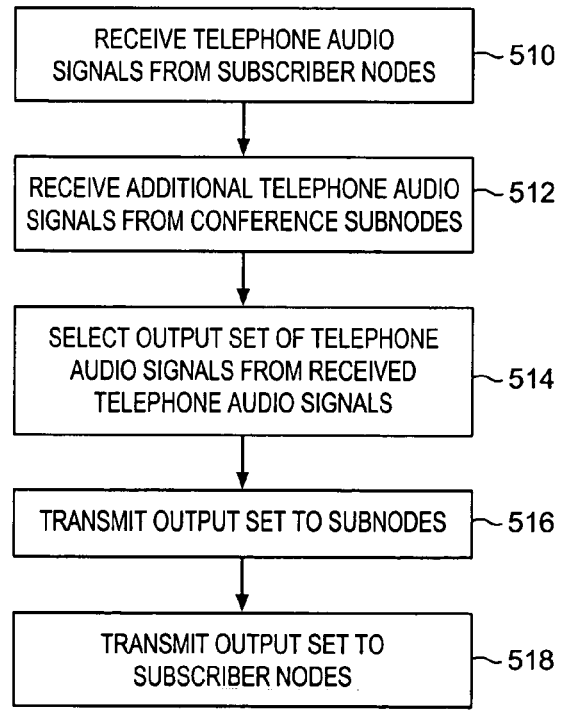

DISTRIBUTED PROCESSING IN CONFERENCE CALL SYSTEMS

BACKGROUND

The present invention relates to the field of telephone conference call management, and in particular to distributing conference call processing tasks among different traffic nodes.

Conference calling is an increasingly important business and social tool. The decreasing cost of telephone connections and of conference services has led to a still further increase in demand. In addition, the number of desired participants is increasing as well. Conference calls with hundreds of participants are not uncommon.

With current conference call systems, the microphone audio from each participant is sent to a shared conference call server. The conference call server combines the microphone audio from all of the calls and sends it back to each participant for playback. Each additional participant increases the required communications traffic bandwidth of the conference call server. As telephone conference call processing moves to video conference call processing, the bandwidth demands are increased still further.

In certain large party conference call systems, the conference call server evaluates the signal of each active audio signal that it receives. It then selects a few of the audio signals to combine for the playback audio. For a conference call with 200 participants, there may be only 20 participants speaking at the same time. Of those, the conference call server selects the 3 to 10 with the highest energy level and limits the playback audio to those audio signals. Any more than 3 to 10 simultaneous speakers can render the playback audio unintelligible. Before sending the audio back to a subscriber, the conference server may also subtract the audio that came from that subscriber. This reduces feedback and unpleasant echo delays. The conference call server may do this for each of the 20 or so subscribers that have active audio. All of this measuring and combining and subtracting places high demands on the processing power of the conference call server. The demands increase significantly as the number of participants and active participants increases. The demands increase still further to support video conferencing.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

FIG. 4 is a flow diagram of handling a conference call from the perspective of a subnode according to an embodiment of the present invention; and FIG. 5 is a flow diagram of handling a conference call from the perspective of a conference node according to an embodiment of the present invention.

DETAILED DESCRIPTION

Figure 1:
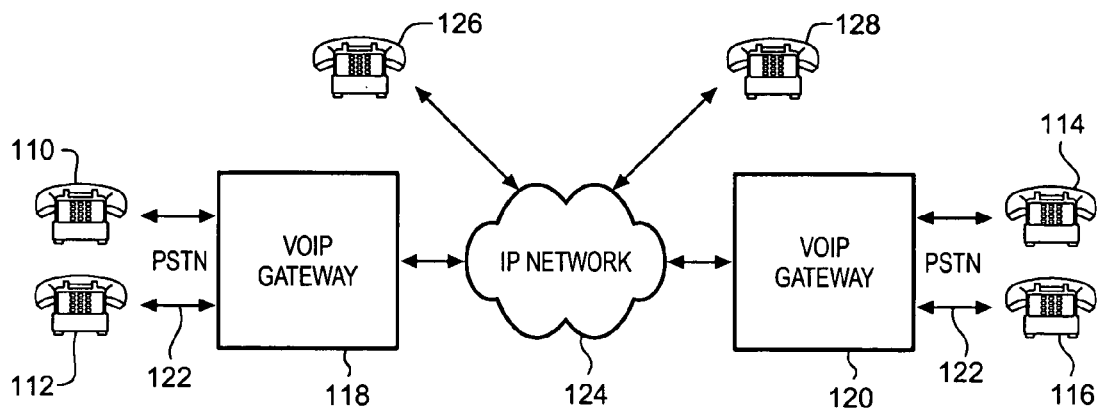
FIG. 1 is a block diagram of telephony network suitable for implementing the present invention.

FIG. 1 shows a VOIP (Voice Over Internet Protocol) network architecture in a simplified block diagram form. This architecture can be used to connect several different telephones together into a conference call. In FIG. 1, subscriber telephones 110, 112, 114, 116, connect to VOIP Gateways 118, 120 or gateway nodes through the PSTN (Public Switched Telephone Network) 122. The subscriber telephone may be any type of subscriber node including wired, wireless, and cordless analog and digital telephones, PBX (Private Branch Exchange) and other types of switches, and any type of data or computing device that can be coupled to the PSTN for voice traffic. The VOIP Gateways are coupled together in FIG. 1 through the Internet 124 or any other IP network, including an intranet and a proprietary network. While two VOIP Gateways are shown, any number of VOIP Gateways can be used.

FIG. 1 also includes IP telephones 126, 128 which are coupled through a network or Internet connection to either one of the VOIP Gateways. The PSTN and IP telephones can participate in the same conference calls through the VOIP Gateways. The particular telephones shown in FIG. 1 are shown as examples. A conference call can also be made using only IP telephones or only PSTN telephones. While six telephones are shown, hundreds of telephones can be connected to a single conference call using this architecture. The PSTN and Internet connections are provided as examples only, any other type of connection can be used to connect the telephones together in a conference call. In addition, while the gateways are shown as VOIP Gateways connected through the Internet, other types of telephone switching equipment can be used and connected through conventional telephony trunk lines.

Figure 2:
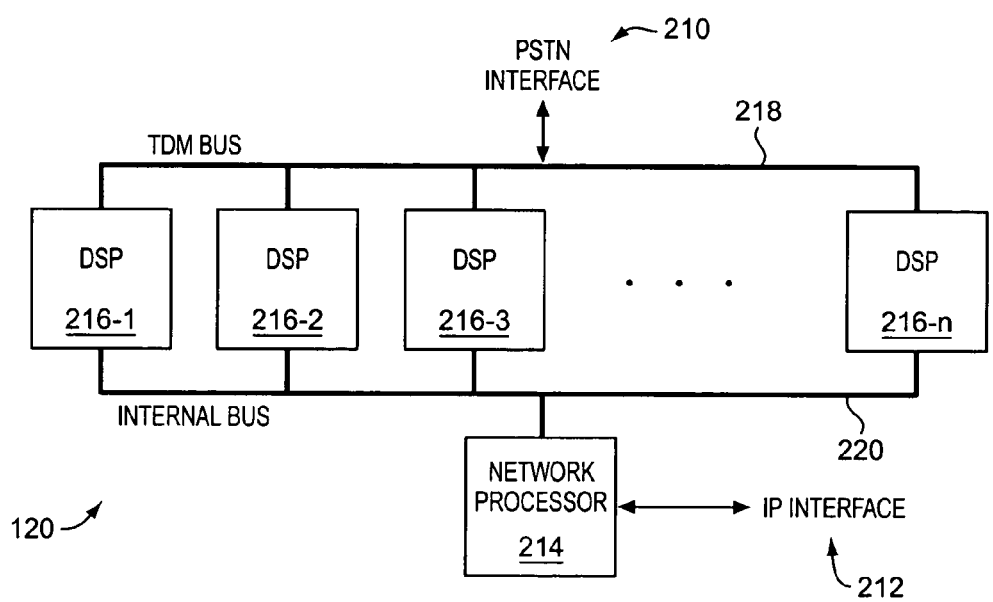
FIG. 2 is a block diagram of a voice network gateway suitable for implementing the present invention.

FIG. 2 shows aspects of a VOIP Gateway 120, such as those shown in FIG. 1. At one end, the Gateway couples to the PSTN through a PSTN interface 210 to send and receive voice from individual telephones or telephony switches. At the other end, the gateway sends and receives voice to the IP network or telephony trunk lines through an IP interface 212. The IP interface is coupled through a network processor 214 which routes voice to the IP interface and also controls a bank of gateway voice processing nodes, also referred to as subnodes of the gateway node. These nodes can be constructed using DSPs (Digital Signal Processor), ASICs (Application Specific Integrated Circuit) or other electronic voice processing devices. One suitable high density VOIP DSP is an Intel® IXS1000.

The network processor handles VOIP packetization and de-packetization using protocols such as RTP (Real-Time Protocol) and RTCP (Real-Time Control Protocol). The network processor also handles normal data IP communication handshakes. Any of a variety of different processors can be suitable as a network processor, including Intel® IXP1200, IXP2400, & IXP2800 network processors.

In FIG. 2, there can be any number of processing nodes greater than one. FIG. 2 shows n processing nodes 216-1 to 216-n. n is a number that is selected to suit a particular application. In many applications n will be between eight and twenty-four but the number of processing nodes can be adapted to suit the demands of the system and the capabilities of the network processor. The nodes are coupled to the PSTN interface through a TDM (Time Division Multiplex) data bus 218. The TDM bus allows voice packets from the PSTN to be routed to an appropriate one of the processing nodes for processing. Each subscriber node or telephone is logically coupled to a particular one of the processing nodes. The TDM bus can be based on a telephony or data communications standard. In one embodiment, the bus traffic is made up of fixed synchronous time slots in which all data is transmitted and received.

In many voice packet formats, each voice packet has a header identifying the subscriber telephone from which the packet comes. The processing nodes analyze this header to determine which packets to receive and process. A similar structure is used to send voice packets to each subscriber node. The TDM bus can carry voice in any conventional format for PSTN systems.

The voice processing nodes are coupled to the network processor 213 through an internal bus 220. The internal communication bus is a general purpose high speed bus for data communications with enough bandwidth to handle the data rate requirements. The bus can be a multi-master bus in which any one of the processing nodes on the bus can send information to others, or it can be a master/slave bus in which a conference node polls data from the other voice processing nodes. A variety of different bus standards can be used for the internal bus, such as PCI (Personal Computer Interface), or UTOPIA (Universal Test and Operations Physical Interface for Asynchronous Transfer Mode)

Figure 3:
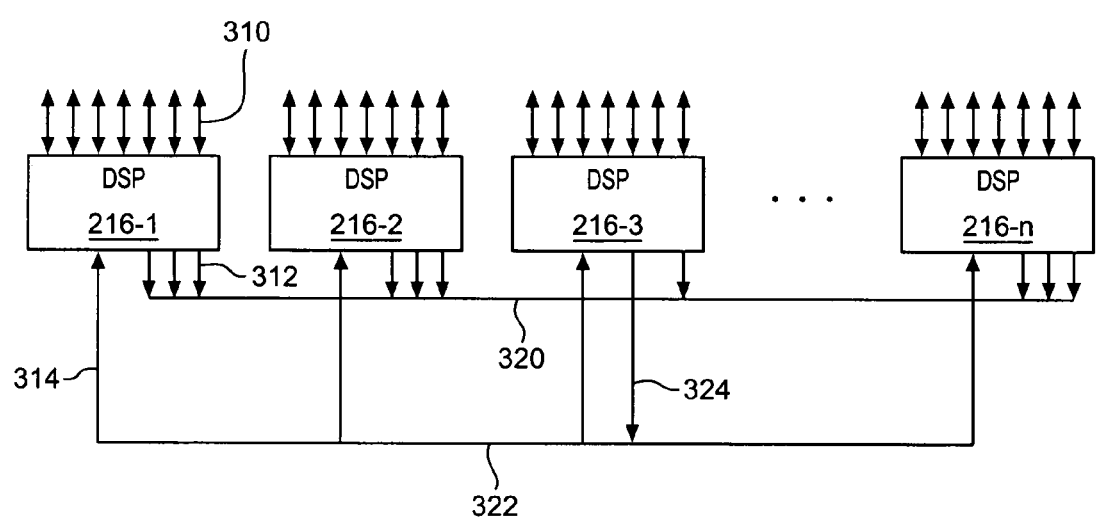
FIG. 3 is a functional block diagram of handling a conference call according to an embodiment of the present invention.

FIG. 3 is a functional diagram of a portion of the gateway 120 of FIGS. 1 and 2. In FIG. 3, a conference call is being provided to a large number of different participating subscriber nodes and each of the voice processing nodes is coupled to several of the subscriber nodes by input and output audio streams 310. There are seven different streams shown for each processing node but the particular number selected will depend upon the particular number of conference call participants and the number and capabilities of the DSPs, among other issues. These audio streams represent the microphone input and speaker output for the respective telephones that are coupled to the conference call through the gateway.

According to the approach shown in FIG. 3, each processing node takes the audio input streams that it receives from its connected subscriber nodes (seven are shown) and selects the strongest inputs 312 (three are shown) to apply to an internal input communication bus 320. The particular number of calls received and the number of calls selected may vary depending on the particular application. The internal bus 220 of FIG. 2 is shown as having two functional components in FIG. 3, an input side 320 and an output side 322. In one embodiment of the invention, each of the processing nodes selects its top three audio inputs and applies them to the input side of the bus.

The audio inputs are all received by one of the processing nodes 216-3 that has been selected or designated as the conference node. The other processing nodes are subnodes to the conference node. As the conference node, a processing node is the conference call manager for purposes of the current conference call. The conference call manager can always be the same processing node or it can be a different one or an arbitrary one of the nodes selected on any number of appropriate criteria. For smaller conferences, nodes can be assigned to serve different conferences and more than one node can be a conference call manager, to manage different concurrent conference calls at the same time. The conference call manager, upon receiving only a few of the audio input streams from each subnode then selects the top audio inputs from those received from each of the subnodes involved in the conference, combines them and sends the combined signal 324 to the output side 322 of the internal bus 220. The combined output signal is received by each subnode and applied as the audio output to each subscriber telephone. The number of audio inputs that are selected by each subnode will depend upon the particular application and can be from three to six or more.

The conference node can also connect to subscriber nodes directly through the network processor on the internal bus. Incoming calls from IP phones can be routed directly to a conferencing node or routed through a conferencing node through another gateway. To establish a conference call, either a gateway node or a separate media server can be designated to provide the conferencing capability. The IP voice data from different subscriber nodes can use different packet and encoding formats, with differing levels of information and compression. As a result, IP voice data can require much more processing power to encode and decode than PSTN voice data does. These enhanced processing requirements are managed particularly well using the multiple node distributed architecture described herein. By contrast, PSTN data from the TDM bus may not have any header identification, only straight data. For encoding and compression it may be simply companded by αLaw or μLaw conversion.

A node including the conference node can improve sound quality for each of its connected subscribers by removing a subscriber's input audio from the subscriber's output audio. This can improve the intelligibility of the audio signal and eliminate a source of feedback. The combined audio output received on the output side of the bus includes audio from some of the connected subscribers, the subscribers can be identified in a header or the gateway node can analyze the combined audio signal. This audio signal can be compared to the input audio signal from each of the subscribers. Using this comparison, the gateway node can remove each subscriber's own audio from the combined audio output, if the subscriber's own audio is present.

By using a data communications standard for the internal bus 220, the conference audio to and from the processing node can be supplemented with additional header information. A flexible header system allows each packet of audio to be accompanied by an identification of the audio and where it came from as well as descriptive information, such as energy measurements.

In this example, each processing node selects the top audio inputs from all of its inputs and puts only those inputs on the internal bus. The node can also put the ranking on the bus or a raw measure from which the ranking was made. As an example, each node can measure the average energy of each audio input stream, select the three streams with the highest energy, then place those three streams and the energy measurement on the internal input bus.

Energy can be measured in many different ways. One example would be to take the analog signal voltage amplitude and average it over some amount of time. Another example would be to take the root-mean-square of the analog amplitude and average it over time. There are many other measures from which energy can be determined. For example, conference call systems can include an automatic level or gain control so that speakers from different locations are heard at similar volumes. The volume determination from an automatic level or gain control algorithm can be used to represent the energy of each call. Telephony systems often use a voice activity detector to stop transmission when a party to a telephone conversation stops talking. Voice activity detectors often measure the energy of each line in some way and compare it to a threshold to determine whether a speaker is active. This measurement can also be used to rank the active speakers. The particular manner in which the energy is measured can be adapted to suit a particular application of the present invention.

Upon receiving this input, the conference node has only to select the audio streams with the highest values overall (including its own input streams), combine them and place them back on the bus. This is only a small increase over the amount of processing that the subnodes must perform. This increase in processing requirements can be accommodated by reducing the number of connected subscribers at the conferencing node. The conferencing node also generates an output stream for each of its own connected subscribers.

It should be noted that the internal communication bus 220 need not carry the audio input and output streams for every conference call subscriber. The output bus need carry only a single audio stream. It can also carry some data identifying the subscriber nodes that have audio included in the one audio stream. Alternatively, the output bus can carry separate streams for each of the selected audio signals. As a further alternative, the audio from a conference node's own subscriber nodes that are included in the output stream can be combined, while audio from subnodes can be carried on the output stream as separate individual streams. In any event, there will be no more streams than there are selected audio sources for the output stream. In the examples above, this will be from three to ten signals at most.

The input bus carries only a portion of the input audio received from each subscriber, because each subnode has filtered out most of its input audio streams. If there are M processing nodes, including the conference node, in a single conference call and each subnode selects N audio streams to apply to the input bus, then the input bus will carry (M−1)N different audio streams. Note that the subscriber nodes coupled to the conference node are not applied to the input bus. If each subnode selects all but the top one fourth of its input audio signals for the input bus, then (M−1)N can be compared to 4MN for a conventional single node conference call input bus. Applying numbers to the illustrated example. If there are ten nodes (M), each coupled to seven subscriber nodes and selecting the top three (N) signals, then the input bus carries 27 input signals. In a conventional system, the input bus would carry 70 signals. This reduction from 70 to 27 decreases the processing requirements for the conference node accordingly.

FIG. 4 shows a flow chart for the functional process described above with respect to FIG. 3 from the perspective of a subnode, i.e. a voice processing node that is not operating as a conference node. As shown in FIG. 4, the subnode receives a set of telephone audio signals at block 410. Each signal is received from a subscriber node that is participating in a single conference call. The subscriber nodes can be assigned to the subnode for purposes of the conference call. The signals have at least an audio component that represents sounds picked up from a subscriber microphone or DTMF (Dual Tone Multiple Frequency) tones produced on a handset, however other types of signals can also be supported.

The subnode selects a subset of the set of received audio signals at block 412. The selection can be performed in many different ways. In one embodiment of the invention, the subnode determines an energy level for each received signal in the set of received signals and selects a subset of the signals that have the highest energy level. The selected subset of signals is transmitted to a conference node at block 414.

At block 416, the subnode receives a second set of telephone audio signals from the conference node. It then transmits the second set to the subscriber nodes at block 418. The second set of telephone audio signals can be a single combined signal or multiple discrete symbols. The signals can be sent to each subscriber node without any further processing or they can be processed to filter out particular signals. For example, in one embodiment, the subnode can filter out the audio from a subscriber node if that audio is present in the second set of signals before sending it to the subscriber node. This can be done in different ways, in one example it can be done by determining the source of each signal in the second set of signals. A subset of signals for each subscriber node can be formed by subtracting out the telephone audio signal received from each subscriber node from the second set of signals, if the respective telephone audio signal is in the second set. The respective subset is then transmitted to each respective subscriber node.

Referring to FIG. 5, a similar process is shown from the perspective of the conference node that is managing all of the callers in a conference call. According to FIG. 5, at block 510, the conference node receives a first set of telephone audio signals. Each signal in the first set is received from a subscriber node of the conference call. As mentioned above, with respect to FIG. 4, the signals can be audio picked up by a telephone microphone or any other type of audio signal. At block 512, the conference node also receives additional sets of telephone audio signals from the conference subnodes, for example the node described with respect to FIG. 4. These sets of telephone audio signals correspond to further subscribers of the conference call. The sets will typically include only a portion of all of the telephone audio signals received by each subnode.

At block 514, the conference node selects an output set of telephone audio signals from all of the received telephone audio signals. It then transmits the output set to the subnodes at block 516 and transmits the output set to the subscriber nodes at block 518. The selection of an output set of signals can be done by determining an energy level for each of the signals and selecting a set of signals that have the highest energy. In another embodiment, the conference node determines an energy level only for the first set. The other sets are received with determined energy levels for each of the telephone audio signals. The conference node then selects a set of signals that have the highest energy level using the received energy level determinations.

It is to be appreciated that a lesser or more equipped conference node, processing node and gateway than the examples described above may be preferred for certain implementations. Therefore, the configuration of the conference node, subnode and gateway will vary from implementation to implementation depending upon numerous factors, such as price constraints, performance requirements, technological improvements, or other circumstances. Embodiments of the invention may also be applied to other types of software-driven systems that use different hardware architectures than that shown in FIGS. 1, 2, and 3.

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various steps. The steps of the present invention may be performed by hardware components, such as those shown in FIGS. 1, 2, and 3, or may be embodied in machine-executable instructions, which may be used to cause general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a media center (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and apparatus are described in their most basic form but steps may be added to or deleted from any of the methods and components may be added or subtracted from any of the described apparatus without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

What is claimed is:

1. A method comprising:
    receiving at a first processing node a first input set of audio signals from a first set of conference subnodes;
    receiving at a second processing node, different from the first processing node, a second input set of audio signals from a second set of conference subnodes, the first and second sets of audio signals corresponding to subscribers of the conference call;
    selecting at the first and second processing nodes respective first and second output sets of audio signals, the first processing node selecting the first output set based on first determined energy levels of the first input set of audio signals, the second processing node selecting the second output set based on second determined energy levels of the second input set of audio signals;
    selecting a third output set of audio signals from the first and second output sets based on third determined energy levels of the first and second output sets; and
    transmitting the third output set to the conference subnodes.

2. The method of claim 1, wherein receiving first and second sets comprises receiving determined energy levels for the audio signals of each set and wherein selecting first and second output sets comprises selecting respective sets of signals that have the highest energy level.

3. The method of claim 1, further comprising receiving a further set of audio signals, each signal being received from a subscriber node of a single conference call and transmitting the third output set to the subscriber nodes.

4. The method of claim 3, further comprising determining an energy level for each signal of the further set, wherein receiving sets comprises receiving determined energy levels for the audio signals of each set and wherein selecting first and second output sets comprises selecting respective sets of signals that have the highest energy level.

5. The method of claim 4, wherein determining an energy level comprises averaging the root-mean-square energy of an audio signal over a predetermined time period.

6. The method of claim 3, further comprising:
    determining the source of each signal in the third output set of signals; and
    forming a subset of signals for each subscriber node by subtracting the audio signal received from each subscriber node from the third output set of signals, if the respective audio signal is in the output sets, and
    wherein transmitting the third output set to the subscriber nodes comprises transmitting the respective subset to each respective subscriber node.

7. A tangible machine readable medium having stored thereon instructions which, when executed by the machine, cause the machine to perform operations comprising:
    receiving at a first processing node a first set of telephone audio signals from a first set of conference subnodes;
    receiving at a second processing node, different from the first processing node, a second set of telephone audio signals from a second set of conference subnodes, the first and second sets of telephone audio signals corresponding to first and second sets of subscribers of the conference call;
    selecting at the first and second processing nodes respective first and second output sets of telephone audio signals, the first processing node selecting the first output set based on first energy levels of the first set of telephone audio signals, the second processing node selecting the second output set based on second energy levels of the second set of telephone audio signals;
    selecting a third output set of telephone audio signals from the first and second output sets based on third energy levels of the first and second output sets; and
    transmitting the third output set to the conference subnodes.

8. The medium of claim 7, wherein the instructions for receiving first and second sets comprise instructions for receiving determined energy levels for the telephone audio signals of each set and wherein the instructions for selecting first and second output sets comprise instructions for selecting respective sets of signals that have the highest energy level.

9. The medium of claim 7, further comprising instructions which, when executed by the machine cause the machine to perform further operations comprising receiving a further set of telephone audio signals, each signal being received from a subscriber node of a single conference call and transmitting the third output set to the subscriber nodes.

10. A telephony conference call node comprising:
    a receive bus interface to receive from first and second processing nodes first and second output sets of telephone audio signals, the first and second output sets being selected from first and second input sets of telephone audio signals from first and second sets of conference subnodes, the telephone audio signals corresponding to subscribers of a conference call;
    a conference node voice processor to select a third output set of telephone audio signals from the first and second output sets based on first and second energy levels of the first and second sets of input telephone audio signals; and
    a transmit bus interface to transmit the third output set to the conference subnodes.

11. The node of claim 10, wherein the processor selects the third output set by selecting a set of signals that have the highest energy level.

12. The node of claim 10, further comprising a telephony bus interface to receive a further set of telephone audio signals, each signal being received from a subscriber node of a single conference call; and to transmit the third output set to the subscriber nodes.

13. The node of claim 12, wherein the processor further determines an energy level for each signal of the further set, wherein the receive bus is further to receive determined energy levels for the telephone audio signals of each set and wherein the processor selects the first and second output sets by selecting respective sets of signals that have the highest energy level.

14. The node of claim 12, wherein the processor further determines the source of each signal in the third output set of signals, and forms a subset of signals for each subscriber node by subtracting the telephone audio signal received from each subscriber node from the third output set of signals, if the respective telephone audio signal is in the output sets, and
wherein the third output set is transmitted to the subscriber nodes by transmitting the respective subset to each respective subscriber node.

15. A telephony gateway node comprising:
a receive bus to receive from first and second processing nodes first and second output sets of telephone audio signals, the first and second output sets being selected from first and second input sets of telephone audio signals from conference subnodes, the telephone audio signals corresponding to subscribers of a conference call;
a conference node voice processor to select a third output set of telephone audio signals from the first and second output sets based on first and second energy levels of the first and second sets of input telephone audio signals; and
a transmit bus to transmit the third output set to the conference subnodes.

16. The node of claim 15, further comprising a telephony bus to receive a further set of telephone audio signals, each signal being received from a subscriber node of a single conference call; and to transmit the third output set to the subscriber nodes.

17. The node of claim 15, wherein the processor further determines an energy level for each signal of the further set, wherein the processor selects the third output set by selecting a set of signals that have the highest energy level.

18. A method comprising:
receiving first and second input sets of telephone audio signals at first and second processing nodes, respectively, each signal being received from a subscriber node of a single conference call;
selecting at the first and second processing nodes first and second subsets of the input sets of signals based on first and second energy levels of the first and second input sets of telephone audio signals;
transmitting the selected subsets of signals to a conference node;
receiving a third subset of telephone audio signals from the conference node; and
transmitting the third subset to the subscriber nodes.

19. The method of claim 18, further comprising determining an energy level for each signal and wherein selecting third a subset comprises selecting a subset of signals that have the highest energy level from the first and second subsets.

20. A tangible machine readable medium having stored thereon instructions which, when executed by a machine, cause the machine to perform operations comprising:
receiving at first and second processing nodes first and second input sets of telephone audio signals, each signal being received from a subscriber node of a single conference call;
selecting first and second subsets of the first and second input sets of signals based on first and second energy levels of the first and second input sets of telephone audio signals;
transmitting the selected subsets of signals to a conference node;
selecting by the conference node from the first and second subsets a third subset of the telephone audio signals; and
transmitting the third subset to the subscriber nodes.

21. The medium of claim 20, further comprising instructions for determining an energy level for each signal and wherein selecting a third subset comprises selecting a subset of signals that have the highest energy level.

22. A telephony voice processor node comprising:
a telephony bus interface to receive first and second input sets of telephone audio signals, each signal being received from a subscriber node of a single conference call;
first and second processing nodes to select from the first and second input sets, respectively, first and second output sets of telephone audio signals based on first and second determined energy levels of the first and second input sets, respectively;
a voice processor to select a subset of the first and second output sets of signals based on third energy levels of the first and second output sets; and
wherein the telephony bus interface transmits the subset to the subscriber nodes.

23. The node of claim 22, wherein the voice processor determines an energy level for each signal of the first and second output sets and selects a subset by selecting a subset of signals that have the highest energy level.

24. A telephony voice gateway comprising:
a telephony bus to carry first and second input sets of telephone audio signals, each signal being received from a subscriber node of a single conference call;
a plurality of voice processor nodes to select first and second subsets of the first and second input sets of signals based on energy levels of the first and second input sets of telephone audio signals;
a transmit bus to carry the selected subsets of signals to a conference node, the conference node being to select from the first and second subsets a third subset of the telephone audio signals; and
wherein the telephony bus transmits the third subset from the conference node to the subscriber nodes.

25. The gateway of claim 24, wherein the voice processor determines an energy level for each signal and selects a subset by selecting a subset of signals that have the highest energy level.

26. The gateway of claim 24, wherein the conference node selects the third subset based upon energy levels of the first and second subsets.

27. The gateway of claim 26, wherein the voice processor nodes determine energy levels for the telephone audio signals of each first and second subset and wherein the conference node selects the third subset by selecting signals that have the highest energy level.

28. The gateway of claim 26, wherein the conference node is coupled to the telephony bus to transmit the third subset to the subscriber nodes.

* * * * *

UNITED STATES PATENT AND TRADEMARK OFFICE
CERTIFICATE OF CORRECTION

PATENT NO. : 7,460,656 B2 Page 1 of 1
APPLICATION NO. : 10/742560
DATED : December 2, 2008
INVENTOR(S) : Lam It is certified that error appears in the above-identified patent and that said Letters Patent is hereby corrected as shown below:

In column 9, line 56, in Claim 19, delete "a subset" and insert -- subset --, therefor.

Signed and Sealed this

Eighteenth Day of August, 2009

David J. Kappos
*Director of the United States Patent and Trademark Office*